May 16, 1939.    L. E. WILLARD    2,158,645
SHOCK ABSORBER PACKING AND SEALING STRUCTURE
Filed Sept. 7, 1938
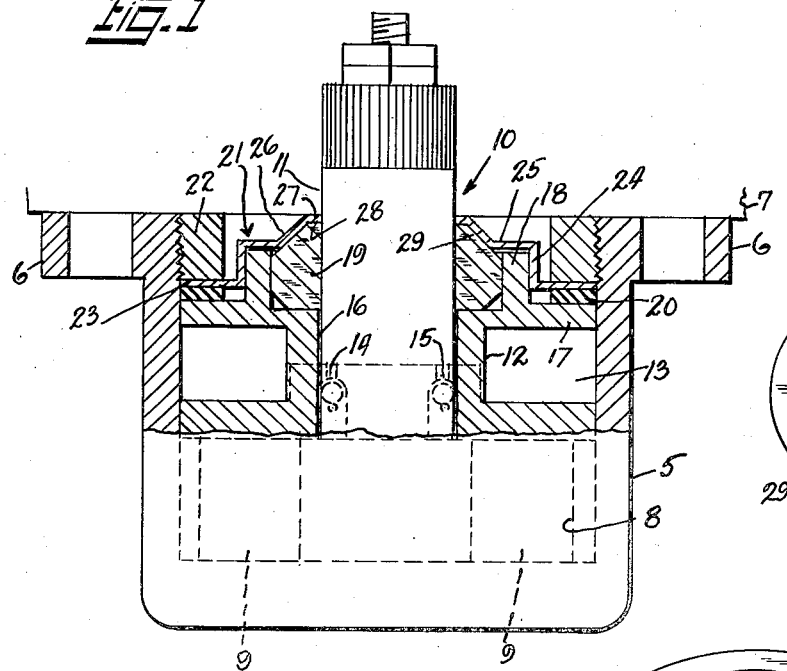
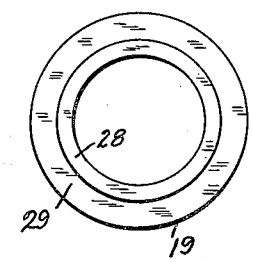
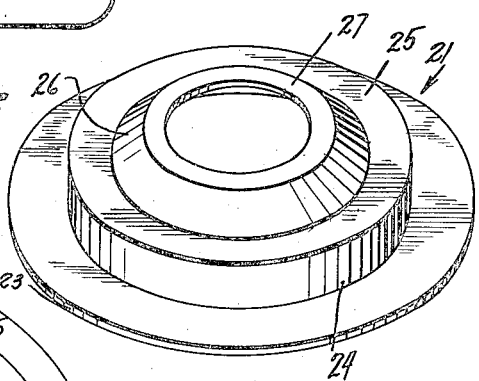
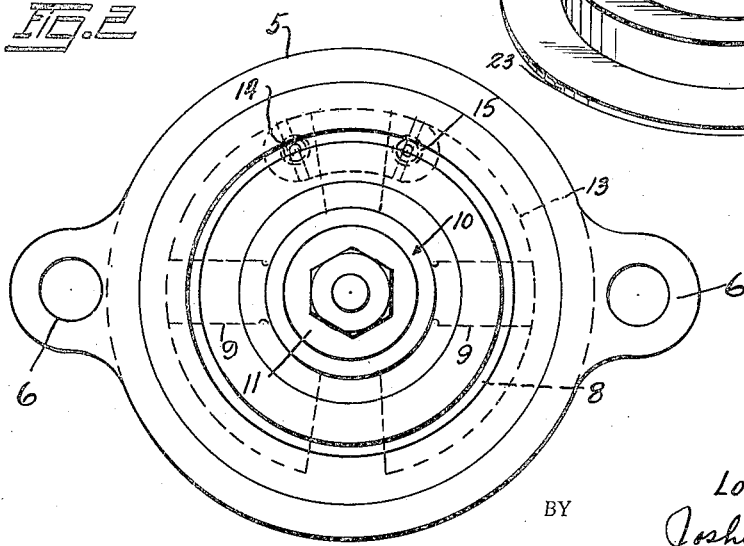
INVENTOR.
Louis E. Willard
BY Joshua E. Davidson
ATTORNEY.

Patented May 16, 1939

2,158,645

UNITED STATES PATENT OFFICE 2,158,645

SHOCK ABSORBER PACKING AND SEALING STRUCTURE

Louis E. Willard, New York, N. Y., assignor to Charles Zimmer, Brooklyn, N. Y.

Application September 7, 1938, Serial No. 228,765

5 Claims. (Cl. 188—89)

This invention relates to hydraulic shock absorbers of the Houdaille type shown in Patent Nos. 1,087,017 and 1,499,660, and more particularly to the packing and sealing structure for such shock absorbers.

One object of the invention is the provision of a sealing cover or retainer for shock absorbers which will permit the use of a relatively large mass packing member or gasket which due to its large mass is highly resilient to effectively seal the shock absorber against leakage from the working chamber thereof. Heretofore the packing in this type of shock absorber was retained by a screw or drive gland, which due to its construction greatly limited the space for such packing, with the result that the packing was practically non-resilient, ineffective and soon wore out.

Another object of the invention is the provision of such a cover or retainer which will act to seal both the piston and reservoir chamber of the shock absorber.

A further object of the invention is the provision of a cover of the character referred to which is adapted to be applied as a repair part to existing shock absorbers and which will effectively cover or shield the entire upper surface of the reservoir chamber in which the stuffing box is located, such surface often becoming marred during repair.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a side view partly in section of a hydraulic shock absorber with my improved packing and sealing means as applied thereto;

Fig. 2 is a top plan view thereof;

Fig. 3 is a perspective view of the double seal cover employed in connection with the said shock absorber; and Fig. 4 is a top plan view of the piston packing gasket.

Referring now to the drawing in detail, in which sufficient of the structure of the shock absorber is shown for the purpose of this invention, 5 indicates the outer casing of the shock absorber which at one end thereof is provided with a pair of perforated lugs 6 for securing same to the chassis 7 of the motor vehicle or car in connection with which it is used. The lower portion of the casing 5 is formed with a suitable working chamber 8 in which the blades or wings 9 of an oscillatable piston 10 operate. The said piston 10 at its upper part comprises a cylindrical portion 11 which may be secured to the axle of the vehicle in the usual manner.

Overlying the working chamber 8 is a reservoir casing 12 having an annular fluid containing chamber 13 for supplying fluid to the said working chamber 8 by means of valves 14 and 15 which are in communication with the said chamber 8. The said reservoir casing is provided with a central bore 16 through which the shaft or cylindrical portion 11 of the piston 10 extends upwardly. Upon the upper wall 17 of the reservoir casing 12 and centrally located thereon is a stuffing box 18 which contains a resilient packing or gasket 19 to seal the bore 16 and prevent the leakage of fluid therethrough. The said packing may be made of any suitable material, such as cork, leather, etc. A second gasket 20 located at the periphery of the wall 17 seals the reservoir 13 and prevents leakage therefrom. Both the gaskets 19 and 20 are maintained in place by a cover 21 held in place by means of a ring or nut 22 which is screw threadedly maintained in the upper portion of the outer casing 5. The gasket 20 may be made of rubber or any other suitable material.

The said cover comprises a lower flange 23 which is pressed downwardly against the gasket 20 by means of the nut 22, an upstanding annular wall 24, a horizontal wall 25, the said walls 24 and 25 acting as an enclosure for the stuffing box 18, an inclined wall 26 and a horizontal flange 27 which overlie and engage the top and inclined surfaces 28 and 29 respectively of the gasket 19 to press same into the stuffing box 18 and against the piston portion 11 to effectively seal the device at this point. The said cover 21 not only acts as a retaining seal for the gaskets 19 and 20 but encloses and covers all of the exposed parts of the stuffing box and reservoir casing, which often become marred and unsightly after being repaired, to give same a finished appearance.

Formerly the central gasket or packing was retained by a screw or drive gland which fitted into the interior of the stuffing box 19 and left but a small space for the packing, the result being a practically dead inefficient seal for the piston. However, with the use of my improved double acting cover or retainer 21, I am enabled to utilize a central gasket of relatively large mass which due to its mass is highly resilient, thus enhancing the life and effectiveness thereof. It is to be understood that by removing the old packing and gland, when repairing a worn out shock absorber of the Houdaille type, my new and improved packing and cover may be substituted without in any way having to alter the structure of the said shock absorber.

From the foregoing, it will be seen that I have provided a highly efficient packing and dual function retainer for shock absorbers which may be used as replacements for the old type of packing and gland of the Houdaille type without in anyway having to alter the structure of the existing or old shock absorber.

Having described my invention, what I claim as new and desire to secure by Letters Patent is:

1. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston, a gasket concentric with the resilient packing for sealing the outer periphery of the reservoir casing at its juncture with the shock absorber casing, a readily removable cover overlying the central packing and concentric gasket, a wall on the cover encircling the outer diameter of the stuffing box and means for pressing the said cover against the said packing and gasket to form a removably maintained double seal for the shock absorber.

2. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston, a gasket concentric with the resilient packing for sealing the outer periphery of the reservoir casing at its juncture with the shock absorber casing, a readily removable cover overlying the central packing and concentric gasket, the said cover comprising a central portion for contacting the central packing, an annular wall encircling the outer diameter of the stuffing box, a peripheral flange for engagement with the concentric gasket, and means in engagement with the said flange for pressing the cover against the said packing and gasket to form a removably maintained double seal for the shock absorber.

3. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston and extending above the stuffing box, a gasket concentric with the resilient packing for sealing the outer periphery of the reservoir casing at its juncture with the shock absorber casing, a readily removable cover overlying the central packing and concentric gasket, the said cover comprising a central portion for contacting the central packing, an annular wall encircling the outer diameter of the stuffing box, a peripheral flange for engagement with the concentric gasket, and an exteriorly threaded nut screw threadedly maintained in the shock absorber casing for engagement with the said flange to press the cover against the packing and gasket and to removaby maintain same in place.

4. In a fluid shock absorber having a casing which provides a working chamber for an oscillatory piston and also provided with a reservoir casing above the working chamber through which the piston extends, the said reservoir being in engagement with the inner diameter of the shock absorber casing and chamber and having a centrally located stuffing box, a resilient packing of relatively large mass in the said stuffing box surrounding the said piston, the said packing having an upper portion approximating a frustum of a cone, a gasket concentric with the resilient packing for sealing the outer periphery of the reservoir casing at its juncture with the shock absorber casing, a readily removable cover overlying the central packing and concentric gasket, the said cover having a central portion similar in shape to the upper portion of the packing for engagement therewith, a lower portion on the said cover for enclosing the outer diameter of the stuffing box, a peripheral flange at the bottom of the said lower portion for contacting engagement with the concentric gasket, and an exteriorly threaded nut screw threadedly maintained in the shock absorber casing for engagement with the said flange to press the cover against the packing and gasket to form a double seal for the shock absorber.

5. For use in a shock absorber of the oscillatory piston type having a reservoir chamber through which the piston passes, the said chamber having a stuffing box surrounding the upper portion of the piston, sealing means for the said piston and chamber, said means comprising a resilient central packing of relatively large mass within the stuffing box occupying its entire area and extending thereabove, a ring gasket at the outer periphery of the reservoir chamber concentric with the resilient packing, a readily removable cover encircling the outer diameter of the stuffing box for engagement with both the ring gasket and central packing, and a nut for pressing the cover against the said gasket and packing to form a double seal for the shock absorber.

LOUIS E. WILLARD.